US009424231B2

(12) United States Patent
Finlayson et al.

(10) Patent No.: US 9,424,231 B2
(45) Date of Patent: Aug. 23, 2016

(54) IMAGE RECONSTRUCTION METHOD AND SYSTEM

(76) Inventors: Graham Finlayson, Norwich (GB); Mark Drew, West Vancouver (CA); David Connah, Norwich (GB)

(*) Notice: Subject to any disclaimer, the term of this patent is extended or adjusted under 35 U.S.C. 154(b) by 114 days.

(21) Appl. No.: 13/391,054

(22) PCT Filed: Aug. 20, 2010

(86) PCT No.: PCT/GB2010/001588
§ 371 (c)(1),
(2), (4) Date: Jul. 5, 2012

(87) PCT Pub. No.: WO2011/021012
PCT Pub. Date: Feb. 24, 2011

(65) Prior Publication Data
US 2012/0263377 A1 Oct. 18, 2012

(30) Foreign Application Priority Data
Aug. 20, 2009 (GB) .................................. 0914603.6

(51) Int. Cl.
*G06F 17/10* (2006.01)
*G06T 5/00* (2006.01)

(52) U.S. Cl.
CPC . *G06F 17/10* (2013.01); *G06T 5/00* (2013.01); G06T 2207/10024 (2013.01)

(58) Field of Classification Search
None
See application file for complete search history.

(56) References Cited

U.S. PATENT DOCUMENTS

| 6,539,126 | B1* | 3/2003 | Socolinsky et al. | 382/274 |
| 2011/0052029 | A1* | 3/2011 | Connah et al. | 382/131 |
| 2012/0263377 | A1* | 10/2012 | Finlayson et al. | 382/162 |
| 2013/0051668 | A1* | 2/2013 | Finlayson | 382/168 |
| 2013/0136378 | A1* | 5/2013 | Finlayson | 382/279 |

OTHER PUBLICATIONS

Anonymous Submission ID 1489 "Surjective Gradient Field Reconstruction" ECCV, 2008.*
Wikipedia, "Grayscale," Jul. 29, 2009.*
MathWorks, Inc, "BLKPROC," 1993.*
FTP directory listing showing date of upload of Anonymous Submission 1489, Mar. 18, 2008 (ECCV Proof.pdf).*
Frankot et al. "A Method for Enforcing Integrability in Shape from Shading Algorithms," 1988.*
Agrawal et al. "What is the Range of Surface Reconstructions from a Gradient Field?" 2006.*
Elad et al. "Reduced Complexity Retinex Algorithm via the Variational Approach," 2003.*
Mathworks, Inc., "BLKPROC," 1993.*

(Continued)

*Primary Examiner* — Vu Le
*Assistant Examiner* — Alexander J Lesnick
(74) *Attorney, Agent, or Firm* — Thomas | Horstemeyer, LLP

(57) ABSTRACT

A method and system for producing a scalar image from a derivative field and a vector image is disclosed. A function class c is selected, where all members of the class c are functions which map each vector of the vector image to a unique scalar value. A function f is selected from the class c which maps the vector image to a scalar image, the derivative of which is closest to the derivative field. The scalar image is generated from the vector image by using f to calculate each scalar value in the scalar image from a corresponding vector in the vector image.

19 Claims, 9 Drawing Sheets

(56) References Cited

OTHER PUBLICATIONS

Wolfram Mathworld entry on Surjective Functions (http://mathworld.wolfram.com/Surjection.html) relied on as extrinsic factual support for the rejection already presented in the previous Office Action.*

Gatta et al. "Local Linear LUT method for spatial colour-correction algorithm speed-up," IEEE Proc.-Vis. Image Signal Process., vol. 153, No. 3, Jun. 2006.*

Fattal et al. "Gradient Domain High Dynamic Range Compression" published in 2002.*

The International Search Report dated Nov. 17, 2010.

Rasche, et al., "Re-Coloring Images for Gamuts of Lower Dimension," Computer Graphics Forum Blackwell Publishers for Eurographics Assoc. UK, vol. 24, No. 3, Aug. 29, 2005, pp. 423-432.

Gooch, et al., "Color2Gray: Salience-Preserving Color Removal," ACM Transactions on Graphics, ACM, US, vol. 24, No. 3, Jul. 1, 2005, pp. 634-639.

* cited by examiner

IMAGE RECONSTRUCTION METHOD AND SYSTEM

CROSS-REFERENCE TO RELATED APPLICATION

This application is the 35 U.S.C. §371 national stage of, and claims priority to and the benefit of, PCT application PCT/GB2010/001588, filed Aug. 20, 2010, which claims priority to and the benefit of Great Britain Patent Application No. 0914603.6, filed on Aug. 20, 2009, herein incorporated by reference in its entirety.

FIELD OF THE INVENTION

The present invention relates to a method and system for image reconstruction from, for example, the gradient domain, and in particular to a method and system which is particularly applicable for image processing such as color to grey scale conversion.

BACKGROUND TO THE INVENTION

In computer vision there are many applications where it is advantageous to process an image in the gradient domain and then reconstruct the gradient field. For example, to remove shadows from an input image, you can differentiate, set the shadow edge gradients to zero and then reintegrate to get an output image without shadows. Similarly, the gradient field is manipulated in lightness calculation and high dynamic range imaging to respectively remove slowly varying illuminant gradients and to compress the image dynamic range.

Typically, these applications follow a three-step work flow. First, a gradient field is calculated from an input image, second, the gradients are manipulated (to impose a desirable property) and then, third, a new image is found by reconstructing the gradient field. For example in lightness computation, shadow removal, and intrinsic image calculation, gradients are respectively set to zero or infilled where small, shadow and non-material edges are identified [3, 9, 13]. In shape from shading and photometric stereo the gradient field (surface orientation) at each point is found and then the shape (height map) results from reconstructing the gradient field [15, 25]. Other applications where Poisson equations appear include image compositing, noise removal and image fusion and enhancement [18, 17, 19].

However, the reconstruction step in existing techniques often introduces artefacts—commonly, smoothed and smeared edges—to the recovered image. This is a result of the inherent ill-posedness of reintegrating a non-integrable field. Artefacts can be diminished, though not removed, by more complex reintegration techniques.

In the data-fusion field, there exists a well-known problem that concerns reintegration. Here a multichannel image possibly comprises information from colour, infrared and other modalities and it is desirable to make a scalar image which captures all the useful contrast information available. Socolinsky and Wolff present an elegant and well-founded algorithm to solve this problem in U.S. Pat. No. 6,539,126. Their method works in three steps: (1) they calculate the Di Zenzo structure tensor for the multichannel image; (2) find the best gradient vector to approximate the tensor; and, (3) reintegrate this gradient field to return a grey-scale image that captures the contrast of the multichannel original. Unfortunately, because the gradient field is usually nonintegrable the method can return poor results (in particular, edge artefacts and smearing).

In the gradient domain data fusion work of Socolinsky and Wolff [22], a single gradient vector is calculated for each pixel (from the multichannel structure tensor) and this is reintegrated to give a greyscale scalar image that captures the contrast of the multichannel original. However, the gradient field is generally non-integrable and when the field is solved using a naive Poisson solver or, even, more recent robust techniques, serious image artefacts remain (often characterised as smearing of edges or bending in flat image regions).

STATEMENT OF INVENTION

According to a first aspect of the invention, there is provided a method of producing a scalar image from a derivative field and a vector image, the method including the steps of:
a) selecting a function class c, wherein all members of the class c are functions which map each vector of the vector image to a unique scalar value;
b) selecting a function f from the class c which maps the vector image to a scalar image, the derivative of which is closest to the derivative field;
c) generating the scalar image from the vector image by using f to calculate each scalar value in the scalar image from a corresponding vector in the vector image.

Preferably, all members of the class c are surjective functions.

Members of the class c may be smoothly varying functions.
Members of the class c may be polynomial functions.
Members of the class c may be second order polynomial functions.
Members of the class c may are look up table operations.
Members of the class c may be look up table operations with local interpolation.

The derivative field may be obtained from an external source or derived from the vector image.

The derivative field may be based on 1st derivative-type calculations.

The derivative field may be based on $2^{nd}$ derivative-type calculations.

The derivative field may be defined as a vector of components wherein each component is a linear combination of at least one order of derivative-type calculations.

The vector image may be a multi-spectral image.
The vector image may be a hyper-spectral image.
The vector image may be a chromaticity image.

According to another aspect of the present invention, there is provided a method of producing a second vector image from a derivative field and a first vector image, including the steps of:
 defining the second vector image to be composed of a separate scalar image in each spectral dimension;
 implementing the method discussed above for each spectral dimension.

According to another aspect of the present invention, there is provided a method of producing a master scalar image from a master derivative field and a master vector image including the steps of:
i) dividing each of the master scalar image, the master derivative field and the master vector image into a plurality of corresponding regions;
ii) applying the method of as discussed above to each region.

Step (c) of the above method may be applied to each region, the step of using f to calculate each scalar value in the scalar image comprises applying a function g to calculate each scalar value in the scalar image from a corresponding vector in the vector image, wherein g is a weighted combination of functions f calculated in step (b) for other proximal regions.

According to another aspect of the present invention, there is provided a method of producing a second master vector image from a master derivative field and a first master vector image, including the steps of:

defining the second master vector image to be composed of a separate master scalar image in each spectral dimension;

implementing the above described method for each spectral dimension.

According to another aspect of the present invention, there is provided a computer implemented image reconstruction system comprising:

a first data receiving module configured to receive data on a vector image;

a second data receiving module configured to obtain data on a derivative field; and a processing unit configured to execute computer program code to generate a scalar image by implementing the method described above, and to output the scalar image.

As has been described above, once an image has been processed in the gradient domain, the result is very often a derivative field which is not integrable. In other words, there is no image which would actually differentiate to provide the derivative field which has been generated in the image processing. Moreover, conventional methods of approximating an integral can leave edge artefacts and smearing in the resulting image. Embodiments of the present invention seek to address these problems by providing a vector image, preferably based on the multichannel original, and assuming that each vector of the vector image maps to a unique scalar value.

In a preferred embodiment of the present invention, a vector image is supplied, received or otherwise obtained in addition to the derivative field, and a function class C is provided based on the assumption that each vector of the vector image maps to a unique scalar value. As is shown below, an advantage of this method is that the step of integration can be avoided completely since it is only necessary to select a function from the class C which maps the vector image to a scalar image, the derivative of which is closest to the derivative field.

Although not necessary to embodiments of the present invention, it is generally preferable for the vector image and the derivative field to come from the same source image in order for the mapping function accurately to represent an approximation of the integral of the derivative field.

Although not necessary to embodiments of the invention, further steps may be employed in order for example to map the image to a desired range of values, depending on the function f and the application of the method. This may, by way of example only, involve matching the mean of the scalar image to the mean of the vector image, making the recovered lightness maximum 1, clipping values to a desired range, and/or making the average shading field equal to the average image brightness.

Implementation of the above method, for example by an imaging system, enables the system to reconstruct a scalar image using reduced numerical calculations in comparison to conventional methods, thereby saving processing resources. In addition, the system is able to output a reconstructed image with significantly improved results in terms of reduced edge artefacts and smearing.

The method can be used for, but is not limited to, producing greyscale images from colour images. It can for example be used to reconstruct a multispectral or hyper spectral image by applying this method to each of the colour channels. Each of the colour channels can for example be taken to be a scalar image and independently calculated from the vector image and derivative field.

It can also advantageously be used in lightness recovery, shading recovery and in colourisation processes.

In some embodiments of the invention, the vector image and the derivative field can be divided into regions. A provisional mapping function can be calculated for each region in accordance with the method described above. Preferably, in these embodiments, when the scalar image is reconstructed, the mapping function which is actually used to calculate each scalar of value is a weighted combination of mapping functions calculated for proximal regions.

Preferred embodiments of the present invention utilise an algorithm for reconstructing gradient fields. It is assume that there is a surjective map relating the multichannel original to the derived scalar image. While this map could take a variety of forms, in preferred embodiments it is assumed it is given by the best map from the gradient of a (nonlinear) function of the multichannel input to the target scalar gradient. In this framework, reconstruction is a simple equation-solving exercise of low dimensionality. To justify this approach, a discussion later in this document shows that assuming Socolinsky and Wolff's gradient field is integrable across all scales, then there must necessarily be a surjective mapping from the multichannel original to the recovered fused image.

Extensive testing of embodiments of the present invention utilising surjective reconstruction in the context of the data fusion problem of turning a colour image into greyscale shows that the embodiments return results that capture similar contrast to that provided by Socolinsky and Wolff, but without the artefacts (and at substantially cheaper computational cost). Experiments also show that the surjective reconstruction is preferred by human observers compared with a variety of competing algorithms.

For the data fusion problem, if it is assumed there is a good answer, then it should be expected to be surjective. That is, the recovered grey-scale image should preferably be a surjective map from the multichannel original. This theorem implies a surprisingly simple (and, it turns out, effective) algorithm for gradient field reconstruction. Let $\nabla J$ denote the target gradient field calculated from the multichannel image $\rho(x,y)$ using the Socolinsky and Wolff method. Assuming surjectivity, solving for a mapping $f(\bullet)$ such that $[\nabla f(\rho(x,y)) \nabla J]^2 \approx 0$. While any map $f(\bullet)$ might be considered, in practice it is advantageous to assume a certain smoothness of the function. In the specific embodiments disclosed below it is assumed $f(\bullet)$ is a 2nd order polynomial. However, other orders of polynomials can also be used. As such, gradient field reconstruction used in embodiments of the present invention is a straightforward equation solving exercise which is both simpler, and much more effective, than existing techniques.

The gradient field reconstruction formulation used in embodiments of the present invention is quite general and so can be applied to other reconstruction problems. However, the reader should note that some of these other problems are not strongly surjective in that they do not have an associated theorem which implies surjectivity.

BRIEF DESCRIPTION OF THE DRAWINGS

Preferred embodiments of the invention will now be described, by way of example only, with reference to the accompanying drawings, in which:

FIG. 1A shows a greyscale image with an illumination gradient;

FIG. 1B shows an albedo-only version of the same image as FIG. 1a;

FIG. 1C shows the derivative of log-brightnesses on a horizontal scan line across the middle of the image shown in FIG. 1A;

FIG. 1D shows an image constructed from reintegrating gradients of the image of FIG. 1A threshold at 0.025;

FIG. 1E shows an image constructed from reintegrated gradients of the image of FIG. 1A threshold at 0.075;

FIG. 1F shows a colour image corresponding to FIG. 1A;

FIG. 1G shows a chromaticity image corresponding to FIG. 1F.

FIG. 1H shows an image following surjective reconstruction;

FIG. 1I shows reconstruction delivered by Agrawal's method for a 0.075 threshold;

DETAILED DESCRIPTION

References are made in the following description to "colour" images. It will be appreciated that colour images cannot be accurately portrayed in a greyscale printed patent specification. The colour images were used as inputs to the various methods and systems discussed. However, in order to assist the viewer, the colour images have been manipulated so as to provide visible contrast differences in image features when printed in greyscale.

Figure 10:
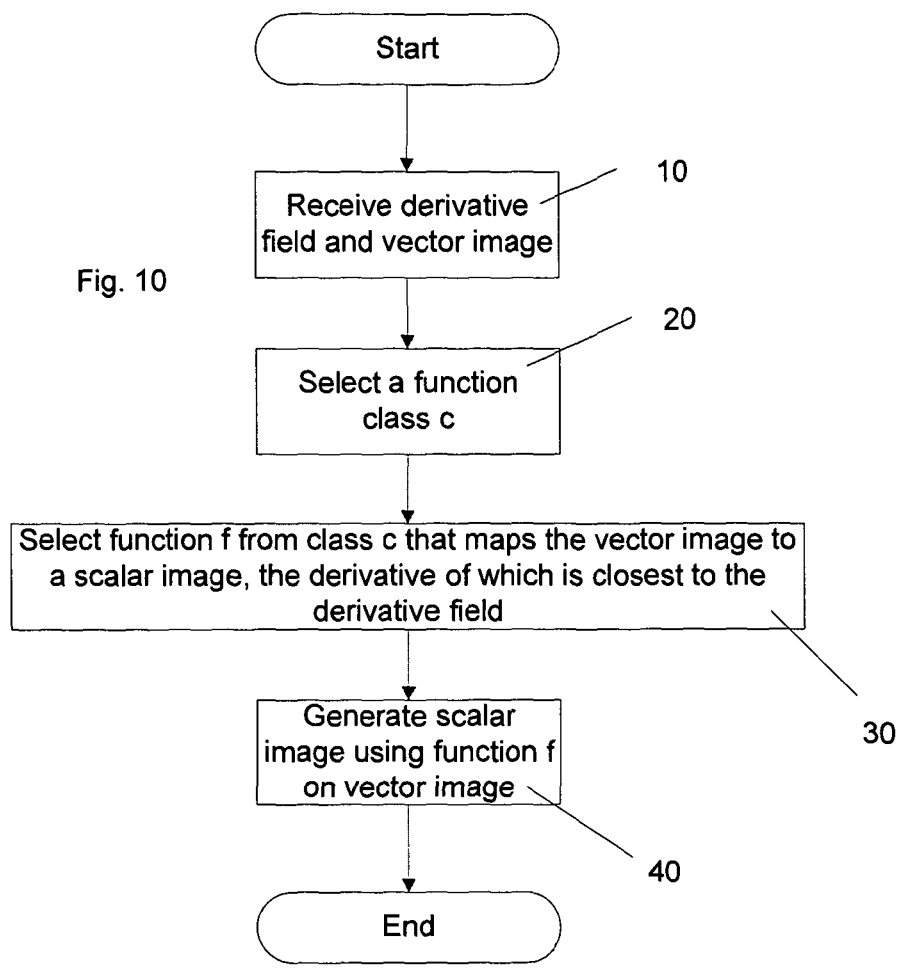
FIG. 10 is a flow diagram of a method according to an embodiment of the present invention.

FIG. 10 is a flow diagram of a method according to an embodiment of the present invention.

In step 10, a derivative field and a vector image are received. In step 20, a function class c is selected, where all members of the class c are functions that map each vector of the vector image to a unique scalar value.

In step 30, a function f is determined from within the class c that maps the vector image to a scalar image, the derivative of which is closest to the derivative field.

In step 40, a scalar image is generated from the vector image by using the function f to calculate each scalar value in the scalar image from a corresponding vector in the vector image.

Figure 11:
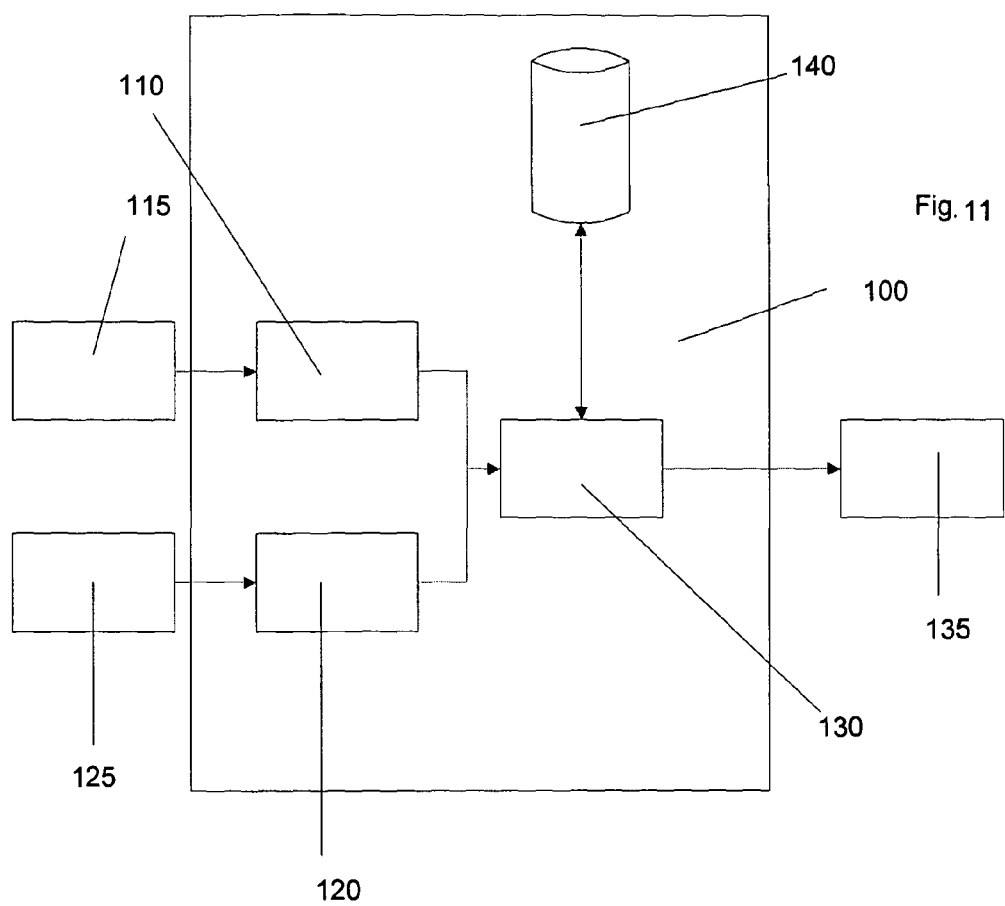
FIG. 11 is a schematic diagram of an image reconstruction system according to another embodiment of the present invention; and, FIGS. 12A and 12B are before and after images illustrating application of an embodiment of the present invention.

FIG. 11 is a schematic diagram of a computer implemented image reconstruction system according to an embodiment of the present invention. The image reconstruction system 100 includes a first data receiving module 110 configured to receive vector image data 115, a second data receiving module 120 configured to receive or obtain data on a derivative field 125 and a processing unit 130 configured to execute computer program code to generate a scalar image 135 by applying the method as described below. It will be appreciated that the first and second data receiving modules may be combined such that the data on the derivative field is derived or otherwise obtained from the vector image data 115. The system may optionally include one or more lookup tables 140 within the class c. The lookup table may be stored locally or remotely to the first and second receiving modules and the processing unit. It may be stored in a database, repository or other data store that may optionally be distributed across a number of physical storage media, nodes or devices. In such an arrangement, the function f may be selected to be a lookup table operation.

To elucidate the surjective method further, the lightness recovery problem is discussed below.

Figure 1:
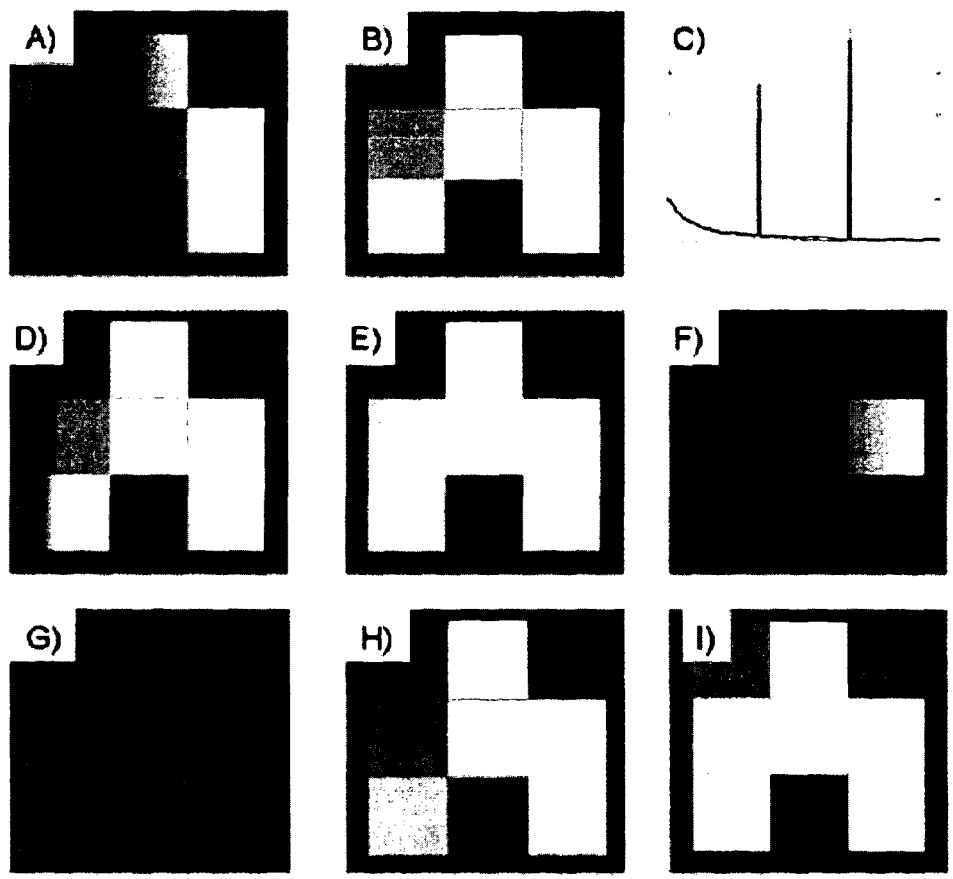

In FIG. 1A, a grey-scale image is shown with an intensity gradient: the light is brighter to the right than to the left. FIG. 1B shows the same image under uniform light. In lightness computation it is desired to calculate 1B from 1A; that is, to remove the slowly varying illumination gradient. Lightness computation begins with the observation that image formation is multiplicative with the image brightness i written as the product of the surface albedo k and the illumination e:

$$i = k * e \quad (1)$$

Multiplication is turned into addition by taking logs:

$$\log(i) = \log(k) + \log(e) \quad (2)$$

Recover k is performed by differentiating log(i), thresholding small derivatives to zero, reintegrating and exponentiating:

$$\kappa = \exp[\nabla^{-1} T(\nabla \log(i))], \quad T(a) = \begin{cases} 0 & |a| < t \\ a & \text{otherwise} \end{cases} \quad (3)$$

where t is a user-defined threshold.

In FIG. 1C the derivative of a cross section of the log of 1A (in the middle of the image) is shown. The slowly varying small derivatives clearly align with the illuminant gradient and the large spikes with the reflectance edges. Two thresholds (horizontal vertical lines) are also shown. Choosing the upper threshold (0.01) results in correct lightness reconstruction (1B is recovered from 1A). Dotted lines indicate thresholds of 0.025 and 0.05 log units. Choosing the lower threshold (0.0025) results in FIG. 1D: an image where there is some residual illuminant gradient. Hence making the wrong choice of threshold can, severely, affect the accuracy of the output. In FIG. 1E, for example, reintegration is performed using a log threshold of 0.075. FIG. 1E looks wrong because real edges have been thresholded out as well as the illumination gradient. Clearly, some of the reflectance edges.

Now it is considered how the gradient reconstruction problem can be solved using the surjective method of embodiments of the present invention. Initially, surjectivity is considered in the context of FIGS. 1A and 1B. Clearly, the input image of FIG. 1A (confounded by an illumination gradient) cannot be mapped to a piecewise constant counterpart as illustrated in FIG. 1B. Surjectivity demands that each input brightness maps uniquely to one output brightness and for this example this cannot be the case: due to the shading the same grey-scale value can occur for two different output reflectance values. However, when the input image is the colour image ρ as shown in FIG. 1F, the situation is different. Because illumination change is an intensity effect, the illumination gradient must be the same for each colour channel. Making the chromaticity image X of FIG. 1F (each RGB is scaled to sum to 1) gives the image in FIG. 1G. It will be noted that the illumination gradient has been removed in the chromaticity image of FIG. 1F. It will also be noted that the chromaticity transform is, itself, surjective: the mapping of input RGB colour (the domain) is onto the output chromaticity (the range).

Assuming that the distinct colours in the chromaticity image correspond to distinct grey-levels in the output piecewise uniform lightness image, it will be seen that in this case there is a surjective map between chromaticity image and the lightness image. However, in the lightness recovery problem the output of the lightness algorithm is not known beforehand. Therefore calculation of the map is performed indirectly based only on the chromaticity image and the gradient field of the log-intensity image log(i). There are a number of ways to achieve this. One way is to take the chromaticity image X and make a 2nd order polynomial expansion: rather than RGB at each point we also have RG, GB, RB, $R^2$, $G^2$ and $B^2$. Calculating the gradient in each of these 9 channels and then finding the linear combination of these closest to the target gradient field is then performed. Solving for:

$$\min_c \left\| \sum_{i=1}^{9} \nabla P(\chi)_i c_i - \nabla T(\log(i)) \right\| \quad (4)$$

where X is the chromaticity of ρ, and ρ(X)$_i$ is the ith term in a polynomial expansion of the chromaticity 2-vector. The coefficient vector c which minimizes Equation (4) (the linear combination of the gradients of the polynomial terms which is closest to the thresholded log intensity gradient) is found by linear regression. The recovered lightness is then equal to:

$$\kappa = \Sigma_{i=1}^{9} P(\chi)_i c_i \quad (5)$$

The result of solving Equation (4) is shown in FIG. 1H. An advantage of this method is that it works in the forward direction in the sense that the reconstruction depends only on the derivatives calculated from the original chromaticity image mapping to those that are desired (the thresholded grey-scale derivatives). Traditional reconstruction works in the backward direction and attempts to reintegrate the derivatives.

While the surjective method has worked well for this example, it is worth making a few remarks. First, notice the necessity of having a multichannel input: for lightness recovery at least 2 channels would be needed. Second, the lightness is recoverable because there is a surjective map of the colour images (the chromaticity transform) which itself maps surjectively to lightnesses. The method would not work if the output lightness image had different grey-scales for the same input chromaticity. Indeed, for lightness recovery on real complex imagery the surjective method would have to be applied locally (and when this happens we start to encounter some of the complexities of Poisson reintegration).

Figure 12A:
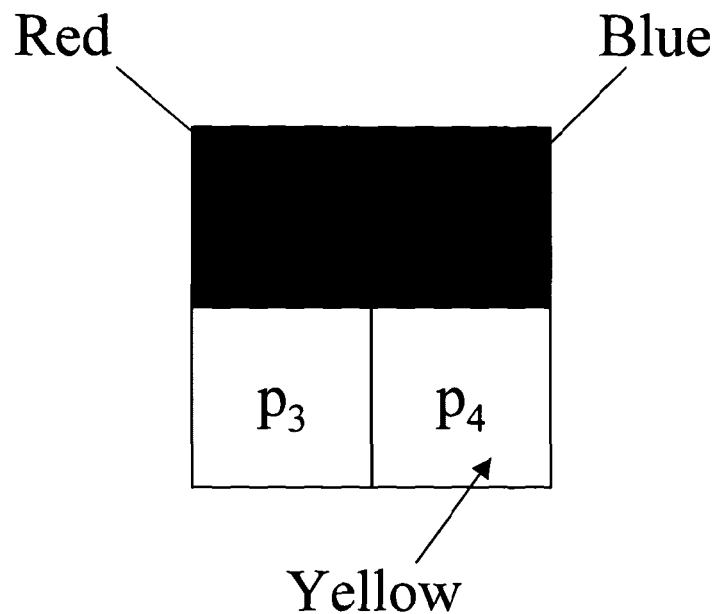

To get a better idea of a method according to an embodiment of the present invention, a simple example from the colour to greyscale problem is considered. A simple 4 pixel image is shown in FIG. 12A. In the original image, the top left pixel ($p_1$) is red, top right ($p_2$) is blue and bottom left and right pixels ($p_3$, $p_4$) are yellow. The image can be characterized by its RGB value ρ at each pixel.

$$\rho(\text{pixel}) = \text{Colour} = [R \ G \ B]$$

$$\rho(p_1) = \text{Red} = [1 \ 0 \ 0]$$

$$\rho(p_2) = \text{Blue} = [0 \ 0 \ 1]$$

$$\rho(p_3) = \rho(p_4) = \text{Yellow} = [1 \ 1 \ 0]$$

From this image the first aim is to generate the gradient field by Socolinsky and Wolff's method. The first step in this is to calculate gradient at each pixel. One way to do this is to approximate by using differences between adjacent pixels: i.e. the x-gradient Δx at $p_1$ is given by $\rho(p_2) - \rho(p_1)$, and the y gradient Δy is given by $\rho(p_3) - \rho(p_1)$ $$\Delta x(p_1) = \rho(p_2) - \rho(p_1) = [-1 \ 0 \ 1]$$

$$\Delta y(p_1) = \rho(p_3) - \rho(p_1) = [0 \ 1 \ 0]$$

The Jacobian matrix Z is then the:

$$Z(p_1) = [\Delta x(\underline{p_1}) \Delta y(p_1)]$$

$$Z(p_1) = \begin{bmatrix} -1 & 0 \\ 0 & 1 \\ 1 & 0 \end{bmatrix}$$

The next step is to calculate Di Zenzo's structure tensor matrix M at each pixel $$M(p_1) = Z^T Z = \begin{bmatrix} 2 & 0 \\ 0 & 1 \end{bmatrix}$$

Where $^T$ denotes the transpose operator.

To generate a scalar field means finding the first eigenvector and eigenvalue of M. The eigenvectors v and eigenvalues $\lambda$ are solutions to the equation $$Mv = \lambda x$$

In this case it is clear that the first and second eigenvectors are $[1\ 0]^T$ and $[0\ 1]^T$ respectively, and the associated eigenvalues are 2 and 1. Note that $[1\ 0]$ and $[-1\ 0]$ are both equally valid as first eigenvectors, and the sign of the final gradient vector is therefore dictated by the sign of a greyscale image: in this example we will make the sign of the gradient agree with that in the Blue channel.

Thus the scalar gradient at $p_1$ is given by $$[\Delta x(p_1), \Delta y(p_1)] = [\sqrt{2}, 0]$$

This calculation can be repeated at each pixel by assuming zero gradient at the boundaries (Neumann boundary conditions). Performing this calculation gives a gradient field $J = Tda(\rho)$ of:

$$J(p_1) = [\Delta x(p_1), \Delta y(p_1)] = [\sqrt{2}, 0]$$

$$J(p_2) = [\Delta x(p_2), \Delta y(p_2)] = [0, -\sqrt{3}]$$

$$J(p_3) = [\Delta x(p_3), \Delta y(p_3)] = [0, 0]$$

$$J(p_4) = [\Delta x(p_4), \Delta y(p_4)] = [0, 0]$$

A naïve approach to reintegrating this field would be to use a simple path-based approach. For example, assuming that $G(p_1)$ has a value of zero, then we can move clockwise around the image incorporating the gradients.

$$G(p_1) = 0;$$

$$G(p_2) = G(p_1) + \Delta x(p_1) = \text{sqrt}(2)$$

$$G(p_4) = G(p_2) + \Delta y(p_2) = \text{sqrt}(2) - \text{sqrt}(3)$$

$$G(p_3) = G(p_4) - \Delta x(p_3) = \text{sqrt}(2) - \text{sqrt}(3)$$

However, $G(p_1)$ should now equal $G(p_3) - \Delta y(p_1)$, which it doesn't. Repeating the re-integration using a different path will, furthermore, lead to a different set of greyscale values in G. This is the problem of non-integrable gradient fields. In a preferred embodiment of the present invention, a polynomial expansion of the input image is built. For the starting image at the first pixel:

$$\rho(p_1) = [R\ G\ B] = [1\ 0\ 0]$$

In the $2^{nd}$ polynomial expansion of this:

$$\rho'(p_1) = [R\ G\ B\ RG\ RB\ GB\ R^2\ G^2\ B^2] = [1\ 0\ 0\ 0\ 0\ 0\ 1\ 0\ 0]$$

and so on for the remaining pixels. This creates is a 9 channel image $\rho'$ (note here that adding the additional channels does not necessarily create additional information for this simple image, but in general new information will be encapsulated in extra channels of the 9 channel image). By using a coefficient vector, $\omega$, a second order polynomial function $f(\rho) = \rho' \cdot \omega$ can be created which is a surjective map from the original image.

The gradient of $\rho'$ can now be calculated using the same differencing scheme. At pixel $p_1$ this gives:

$$\Delta x'(p_1) = \rho'(p_2) - \rho'(p_1) = [-1\ 0\ 1\ 0\ 0\ 0\ -1\ 0\ 1]$$

$$\Delta y'(p_1) = \rho'(p_3) - \rho'(p_1) = [0\ 1\ 0\ 1\ 0\ 0\ 0\ 1\ 0]$$

and so on for the remaining pixels.

Calculating $\omega$ can be done as a transform which relates the polynomial gradient $\Delta x'\ \Delta y'$ of to the original scalar gradient J Specifically, two 4×9 matrices are built (more generally the size of this matrix is (no. pixels)×(no. coefficients in the polynomial expansion))

$$P_x = [\Delta x'(p_1)^T \Delta x'(p_2)^T \Delta x'(p_3)^T \Delta x'(p_4)^T]$$

$$P_y = [\Delta y'(p_1)^T \Delta y'(p_2)^T \Delta y'(p_3)^T \Delta y'(p_4)^T]$$

and then these are concatenated to get an 8×9 matrix $$P_{xy} = [P_x P_y]$$

Now the x and y components of J are concatenated to give an 8×1 matrix $$J_{xy} = \begin{bmatrix} J_x \\ J_y \end{bmatrix}$$

and these two quantities are related using $$J_{xy} = P_{xy} \omega$$

This is solved by minimising the functional $$\min_c \|J_{xy} - P_{xy} \omega\|$$

Where the $\|\ \|$ operator denotes the vector 2-norm. Which results in the equation:

$$\omega = (P_{xy}^T P_{xy})^{-1} P_{xy}^T J_{xy}$$

where the matrix inverse operator is denoted $^{-1}$. When there are fewer colours in the image than terms in the polynomial (as is the case in this example) the Moore-Penrose pseudo-inverse is used instead of the inverse operator.

The result for this image is a coefficient vector (rounded to the $4^{th}$ decimal place)

$$\omega = [-0.38\ -0.0353\ 0.38\ -0.0353\ 0\ 0\ -0.38\ -0.0353\ 0.38]$$

In other words, of the class of functions $f(\rho) = \rho' \cdot \omega$, $\omega$ is calculated such that the derivative of $f(\rho)$ is closest to the gradient field J of the original image.

In order to generate the final grayscale image, $f(\rho)$ is calculated by multiplying the vector $\omega$, which was derived to minimise the gradient error, direct to the enlarged image at each pixel $\rho'$ $$G(p_1) = \rho'(p_1) \cdot \omega$$

where the operator on the RHS is the dot-product. For this simple 4 pixel image this leads to:

$$G = \begin{bmatrix} -0.7601 & 0.7601 \\ -0.8660 & -0.8660 \end{bmatrix}$$

In order to map this final image onto the range [0,1] a range of gamut mapping strategies could optionally be employed. One such strategy is to shift the image to make the mean equal to 0.5 by firstly subtracting the mean, and then adding 0.5 to all values $$G = \begin{bmatrix} 0.1729 & 1.6931 \\ 0.0670 & 0.0670 \end{bmatrix}$$

The final (optional) stage would then clip any out of range values to [0 1]. This strategy leads to a final greyscale output of:

$$G = \begin{bmatrix} 0.1729 & 1 \\ 0.0670 & 0.0670 \end{bmatrix}$$

Figure 12B:
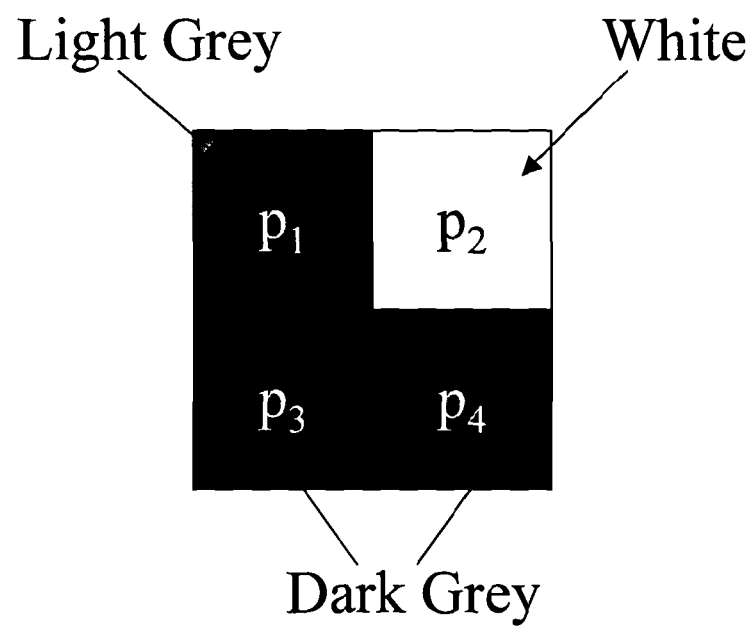

The final image is shown in FIG. 12B (with values corrected for the display gamma).

The function class $f(\rho)$ need not necessarily be the class of functions that map $\rho$ to $\rho'\omega$ (second order polynomials of RGB). Aside from higher/lower order polynomials, there are other classes of function, for example a simple look-up-table, that satisfy the surjective property while not having the form $\rho > \rho' \cdot \omega$.

Likewise for the computation of the gradient, although the above described example uses local-differencing, other implementations are possible. For example, a different strategy could be used to approximate the gradient in each channel (e.g. sobel operators).

In section 2 below a short review is provided of the gradient reconstruction problem in general, followed by a discussion of two other reconstruction problems that can be solved surjectively. The method of Socolinsky and Wolff is also discussed for fusing a multichannel image into a single grey-scale counterpart. In addition, the shape from shading problem for colour images is discussed.

A surjective method according to embodiments of the present invention is presented in section 3. Formulations for surjective multi- to single-channel data fusion and shading field recovery are given. Results for converting colour to grey-scale (a data fusion topic which has attracted attention recently) and recovering the shading field in colour images are shown in section 4. For the data fusion problem, an evaluation of an algorithm according to an embodiment of the present invention is presented in a preference experiment with human observers. Here, an observer must choose which output from a variety of algorithms is preferred (without knowing which images are generated from which algorithms). Not only is the surjective method shown to be preferred compared with the original Socolinsky and Wolff method but it is also preferred compared with other colour to grey scale algorithms. Sections 5 is the conclusion.

Section 2

The problems associated with the least-squares approach to reintegrating a, usually non-integrable, gradient field are well known. Indeed, finding a re-integrated image which when differentiated is closest in a least-squares sense to the original gradient field (Equation. 1) is only one of many optimisations. In [12], shadow free images are found by reintegrating a gradient field where shadow edges are set to 0. In that paper, an image was represented as a grid-graph and reintegration was formulated as finding an appropriate Hamiltonian path along which an image is reintegrated as if it were a 1D function. There, appropriateness was determined by a cost function which measured the likelihood of reintegration errors. More specifically, a means was presented for determining whether the same surface reflectance was present across a shadow edge (this is the assumption when setting shadow edges to 0). When this condition is met the gradient field is integrable. Their method had the disadvantage that some pixel locations were not visited by the reintegration path and as a result there were gaps in the reintegrated image. In-filling the gaps delivered reasonable results. More generally, this idea of determining which parts of images are integrable and which are not is explored by Agrawal et al. [1]. Non-integrability is identified as gradient field locations with an above-threshold curl. They too view an image as a grid graph, where connectivity is a function of the curl present at an image location. Edges omitted because of non-integrability are estimated from those that are integrable. Once an integrable field has been recovered, a traditional Poisson solver can used to reintegrate the gradient field. In FIG. 1I the lightness recovery of the Agrawal et al. method is shown where, like the recovery shown in FIG. 1E, thresholding is performed on the gradients less than 0.075 to zero. Compared with the Surjective reintegration FIG. 1H, the Agrawal et al. method is visually comparable. However, note that recovery is still not exact: the squares in the top row are too light. Failure here is indicative of a gradient field that is so non-integrable it cannot be repaired to be the same as that of FIG. 1B. Quantitatively, the surjective method performs slightly better compared with Agrawal:

the correlation coefficients between the reintegrated gradients and the original image are respectively 0.90 and 0.99 for Agrawal and Surjective.

2.1 Gradient Domain Data Fusion

There has been recent interest in the problem of converting colour (or, in general multi-dimensional) image data into grey-scale [21, 22, 14, 2]. One of the best performing (and mathematically elegant) approaches is that proposed by Socolinsky and Wolff. Their method begins with the calculation of the Di Zenzo [6] colour gradient. Let $\rho(a,b)$ denote an image with vector values at each location (a; b).

The gradient in the x and y directions are vector quantities denoted $\nabla_x(a,b)$ and $\nabla_y(a,b)$. Suppose it is desired to determine the vector gradient in the direction $w[u\ v]^t$ (w has unit length). If $M=[\nabla_x(a,b)\ \nabla_y(a,b)]$ then $\nabla w=Mw$.

The matrix $\Sigma(a,b)=M^tM$ is called the structure tensor and captures the relationship between directionality and magnitude of the vector field: $w^t\Sigma w$ is the magnitude of the gradient in direction w. To a first approximation the colour tensor can be represented as a single unsigned gradient vector (x and y derivative) at each pixel (its magnitude is the square root of the largest eigenvalue of $\Sigma$ and its orientation is given by the corresponding eigenvector). The sign can be determined by the gradients of brightnesses in the original image (where the sign is uniquely determined). Because the gradient field here is a Tensor derivative approximation, we write:

$$\nabla J = Tda(\rho(x,y),(\rho(x+1,y),\rho(x,y+1))=Tda(\rho) \quad (6)$$

The resulting gradient field, which is typically nonintegrable, is reintegrated to minimize squared error, to give a colour contrast preserving grey-scale encoding [21]. Finding the scalar image I which minimizes (6) in the leastsquares sense:

$$\min_I \|\nabla I - \nabla J\| \quad (7)$$

We solve (7) by assuming $\nabla^2 I = div(\nabla J)$. The Laplacian is modeled as a linear operator operating on the image and I is recovered by inverting the Laplacian given $div(\nabla J)$ as input.

Figure 2:
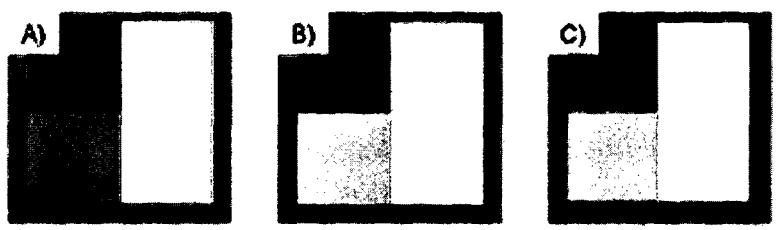
FIG. 2A shows a simple colour image.
FIG. 2B shows the image of FIG. 2a reconstructed using the Sotolinsky and Wolff approach.
FIG. 2C shows the image of FIG. 2A using the much cleaner surjective reconstruction.

In FIG. 2A, an input (originally colour) image is shown. In the original image, the top left square is red, the bottom left is green and the right hand rectangle is white. The resulting grey-scale image recovered by the Socolinsky and Wolff method is shown in FIG. 2B. Notice the large amount of smearing and "bending" around the edges, particularly in the upper left square. This is due to the nonintegrability of the gradient field and the least-squares recovery. In Socolinsky's thesis [23] he discusses a reconstruction technique that maps the level sets in the Luminance image to the level sets in the output. Significantly, the amount of smearing in the output is reduced. However, the method requires a degree of quantisation of the input and is fairly laborious to compute and results in a diminished-contrast solution. A reference implementation was not available.

2.2 Recovering Shading from Colour Images

Shape from shading methods generally assume that intensity in an image varies with the shape of the object. Of course intensity also changes at material boundaries, and so it is of interest to find a method for disentangling material from shape changes [20]. Briefly recapitulating the method set forth in [13]. An image formation equation can be stated:

$$\rho = \sigma I \int E(\lambda) S(\lambda) q(\lambda) d\lambda - \sigma Ic \quad (B)$$

In this equation, $\sigma$ represents shading and/is light intensity (spatially varying), E is illumination, S is surface reflectance, and q and c are respectively the device spectral sensitivities and the colour response. Ultimately, we are interested in the shading-intensity field $\sigma I$ since this term is a required input to shape from shading algorithms.

To proceed, it is useful to define some auxiliary terms: Let L be scalar "luminance" (or brightness), $L=\Sigma_{k=1}^{3} pk$ and let $k_{k=1}^{3}$ ck be lightness. The k image is piecewise constant and only changes with material change. We again use chromaticities. Here $X=\rho/L$. Now, the following relations can be defined:

$$J=\log(\sigma I);$$

$$\log \rho = \log(\sigma I) + \log c;$$

$$\log \chi = \log c - \log \kappa;$$

$$\log L = \log(\sigma I) + \log \kappa. \quad (9)$$

Suppose large changes in chromaticity are found by thresholding the chromaticity: Since $\Sigma_{k=1}^{3}=1$ only the first two components $\{r,g\}=\{X1,X2\}$ of $\chi$ can be used to form a chromaticity edge map:

$$E=\{(\|\nabla r\|^2+\|\nabla g\|^2)^{1/2}>t\} \quad (10)$$

with t a user-defined threshold value and E is true where there is an edge and false otherwise. Assuming that large changes in shading and intensity do not coincide with large colour changes, this thresholding operation gives a reasonable indicator of colour changes.

The above discussion sets out the basic tools for recovering the shading intensity field. Assuming that the gradient field of the shading image can be calculated as:

$$\nabla J = \text{zeros}(\nabla \log L, E) \quad (11)$$

where the function zeros(•) assigns the left hand side gradient and sets it to zero where the threshold image, E, is true. Thus the meaning of equation. (11) is that the gradient field $\nabla J$ is equal to all gradient information in the log brightness image, but with large changes omitted. Reintegrating returns J and then exponentiating gives us the shading ($\rho I$). Thus we have recovered all of the shading-intensity field from the luminance and the edge mask. Then, using equation (9) we can solve for the lightness field k.

Figure 3:
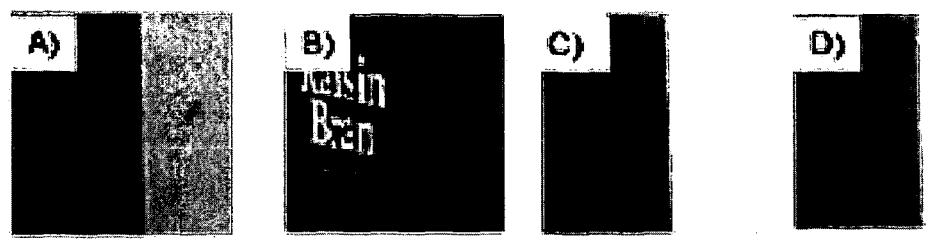
FIG. 3A shows an original colour image of a cereal box.
FIG. 3B shows the recovered albedo of the image of FIG. 3A.
FIG. 3C shows the corresponding intensity-shading field from which the recovered albedo of FIG. 3B is calculated.
FIG. 3D shows the surjective reconstruction.

In FIG. 3A the simple picture of a cereal box is shown from the original study [13]. FIG. 3B shows the recovered k image and FIG. 3C the recovered intensity-shading field which is the input to shape from shading. This shading-recovery problem is considered as one problem domain for surjective reconstruction below.

3. Surjective Reconstruction

In the surjective approach it is proposed that:

$$\|\nabla f(\rho) - \nabla J\| \approx 0 \quad (12)$$

where f(•) denotes a surjective map. That is, it is assumed that the reconstructed image is an onto map from the multichannel original (it will be appreciated that the term 'onto map' is another term for a 'surjective map').

Figure 4:
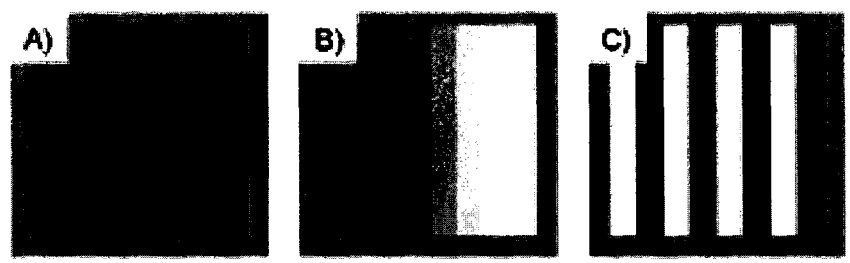
FIG. 4A shows a simple colour image.
FIG. 4B shows an exact reconstruction of the image of FIG. 4A using the Socolinsky and Wolff method.
FIG. 4C shows a surjective gradient field reconstruction of the colour gradient image calculated for FIG. 4A.

Intuitively, it might be argued that surjectivity (at least to some degree) is a good thing. FIG. 4A shows an image composed of alternating red and blue stripes (red starting at the left hand side followed by blue). Calculating the gradient field according to the Socolinsky and Wolff method gives FIG. 4B. Clearly the image looks wrong, the encoding as a 'ramp' does not look realistic. But, the construction is in fact exact: the tensor gradient field of FIG. 4A is integrable and is exactly reconstructed in FIG. 4B. The figure looks unnatural because, perceptually, we would like the same colour to map to the same grey-scale. FIG. 4C shows the more natural looking surjective grey-scale encoding which looks perceptually plausible.

This unnaturalness can be tackled by enforcing integrability over all scales. One way to do this is to compare image locations which are an offset apart. The notation $\nabla I_{x,y,a,b}$ is used to denote the gradient calculated as: $[I(x+a)-I(x)I(y+b)-I(y)]^t$. This idea is used in the Retinex dynamic range compression algorithm as a means to incorporate information from all scales in an image[10]. Other scale space decompositions can be used here. For example a similar argument can be made using a Gaussian Pyramid and using Difference of Gaussian operators as a scale dependent differential operator.

In terms of gradients calculated from the colour tensor, the notation $\nabla J_{x,y,a,b} = Tda(\rho(x,y),\rho(x+a, y)),\rho(x,y+b)$ is used where the neighbouring pixels in each of the colour channels are also and offset (a; b) away. To allow gradients to be calculated without worrying about offsets that go outside the image extent it is assumed that the image is periodic so that offsets can wrap around. A periodic image is made by replicating an image first by mirror reflecting at the right hand border of an image and then reflecting horizontally at the bottom of the image. This results in a new image 4 times the size of the original which is now periodic. This flip-flip operation is common when using Fourier methods to manipulate the gradient field of the image.

Surjectivity Theorem for Colour to Grey-scale:

Suppose that I is recovered from $\nabla J = Tda(\rho)$ such that $\nabla I = \nabla J$ (the gradient field is integrable) and that $\nabla I_{x,y,a,b} = Tda(\rho(x,y),\rho(x+a,y)),\rho(x,y+b)$ then $I=f(\rho)$.

Proof: Suppose that $\rho(x,y)=\rho(u,v)$ where $\rho=x-a+1$ and $v=y-b+1$. Then by simple substitution $I_{x,y,1,1}$ (a normal tensor derivative) is the same as $I_{u,v,a,b}$.

Further, $I(x+1,y)=J(x,y)=I(x+1,y)=I(u,v)$. This implies that $I(x+1,y)-I(x,y)=I(x+1,y)-I(u,v)$ which is true if and only if $I(u,v)=I(x,y)$. Similarly, $I(x,y+1)-I(x,y)=I(x; y+1)-I(u; v)$ implies $I(u,v)=I(x,y)$.

Thus, the same colour in an image is mapped to the same greyscale in I: there is a surjective map taking $\rho$ to I.

Two observations are made about this theorem. First, at heart it says something simple: if we are allowed to compare two colour pixels at different locations and assess their contrast (which seems reasonable) and a grey-scale is recovered exactly then colour is a one-to-one map to greyscale. Second, although the proof is tailored to the data fusion problem from a multichannel image, the surjective method can also be applied to other gradient-domain problems.

Recovering Shading from Colour Images

Recovery of the shading field from a colour image is performed in two stages. First, k (the scalar colour albedo) is recovered. Second k is substituted in equation (9) to recover the shading field σI. To begin, the log intensity gradient from the image is calculated, ∇ log L, and locations where it is expected there is not a material edge are set to zero. The thresholded log-intensity gradient is written as zeros ($\nabla \log L, \neg E$). This gradient field should be the same as the lightness. A surjective solution can now be performed:

$$\min_c \left\| \sum_{i=1}^{9} \nabla P(\chi)_i c_i - \text{zeros}(\nabla \log L, \quad \mid E) \right\| \quad (13)$$

Calculating k can be done using equation (5). Substituting into equation (9), the shading field can be recovered. FIG. 3D shows a surjective reconstruction of the shading image. It is remarkably close to that returned by solving the Poisson equation.

Colour to Greyscale

The Socolinsky and Wolff procedure is not based on thresholding. Rather, the gradient field is constructed from the colour differential tensor. Thus the target gradient ∇J is calculated according to equation (6) and the surjective minimization is:

$$\min_c \left\| \sum_{i=1}^{9} \nabla P(\rho)_i c_i - \nabla J \right\| \quad (14)$$

Note that the polynomial expansion is on the full colour RGB (not the chromaticities as previously). The recovered grey-scale image is calculated as:

$$G = \Sigma_{i=1}^{9} P(\rho)_i c_i \quad (15)$$

FIG. 4C shows the surjective reconstruction of the colour gradient image calculated for FIG. 4A. Note that the reconstruction is much more realistic than solving directly using Socolinsky and Wolff.

Any integration process essentially leaves a constant of integration undefined. This constant is generally heuristically defined. For colour to grey-scale a scalar is added so that the mean of the grey-scale image equals the mean of the colour input. In lightness recovery multiplication by a factor is performed so the recovered lightness maximum is 1. In shading recovery multiplication by a factor is performed so the average shading field equals the average image brightness.

As described, embodiments according to the present invention find a single function (usually a surjective map) that takes a vector image to a corresponding scalar counterpart. Of course one can envisage different functions being employed in different parts of the image. There are numerous ways in which this can be implemented.

For example, an image could be split into k regions and for each region calculate $f_1(\ )$, $f_2(\ )$, $f_k(\ )$. A pixel (i,j) with vector value v might be distances $d_1, d_2, \ldots, d_k$ from the centres of each region. The functions can then be combined:

```
out=(1/d_1)*f_1(v)
term=1/d_1
For i=2:k
    out=out+(1/d_i)f_i(v)
    term=term+(1/d_i);
End
out=out/term
```

It will be appreciated in the above pseudo-code that the outputs according to the k functions are calculated and weighted inversely proportional to the distance to the region centres making sure their weights sum up to 1.

Conversely, per pixel the contributions from k basis functions can be defined (e.g. define the weights in a preprocessing step) and then solved for the k best functions that map input vector image to scalar counterpart (by minimizing the derivative differences in the usual way). One simple incarnation of this scheme would be to use a Radial Basis Function Network [Neural Networks for Pattern Recognition Christopher M. Bishop Oxford University Press (1995), the contents of which are herein incorporated by reference].

As well as allowing a spatially varying function to be applied, the function need not be smoothly varying (although we would argue it often should be). Indeed, the function f( ) could be implemented as a look-up table where each unique vector maps to a single scalar counterpart. Here f( ) would be found, i.e. populate the entries of the look up table, through optimisation. Such a lookup table could be modeled in the form of a long N-component vector of numbers T. The kth entry of T corresponds to the kth unique input vector and there are N unique vectors in the input image. Derivative information can be modeled as a P×N matrix M pre-multiplying T. For example if we are interested in Ti−T_j we insert a row in M which is all zeros except we place the 1 and −1 at columns i and j. Multiplying this row with T results in the difference (derivative) of interest. For every derivative in the image, a row is added to M. If we have x and y derivatives at a Q pixel image then P=2Q. For each row in M, the actual value of the derivative is also known at that point. Thus a set of linear equations of the form MT=V (where V are the derivatives in the image) acne be produced. T refers to the lookup table which can be found as T=pseudo-inverse(M)V (where any appropriate pseudo inverse could be used).

Clearly, the look up table method could also be spatially varying. Also, we might wish to solve for a sparser table (e.g. quantise the image vectors) and then apply linear interpolation.

4. Experiments

Figure 5:
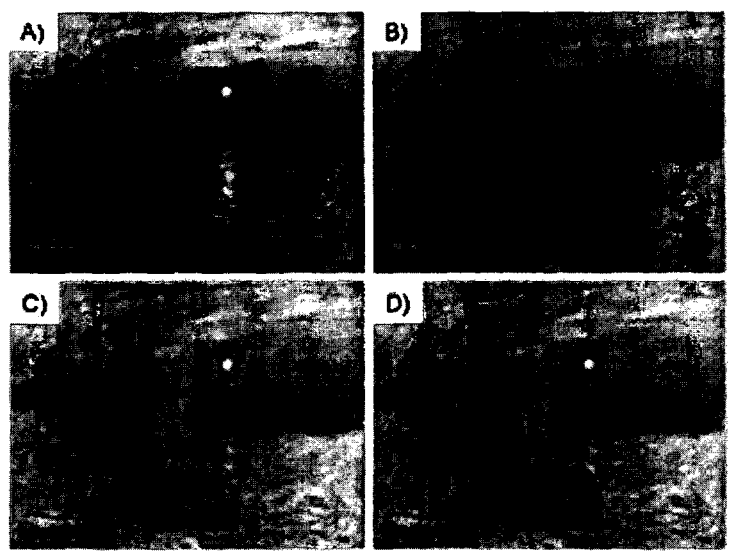
FIG. 5A shows a colour painting.
FIG. 5B shows the usual greyscale of FIG. 5A.
FIG. 5C shows the grey-scale of FIG. 5A produced by the method of Socolinsky and Wolff.
FIG. 5D shows the grey-scale of FIG. 5A produced by the surjective colour gradient field reconstruction.

In FIG. 5A show a painting by Monet is shown. FIG. 5A was originally in colour and reduced to greyscale with contrast altered to highlight the differing features for the purposes of this document. The normal Luminance encoding of this image is shown in FIG. 5B. Notice that the contrast between the sun and sky is gone and the sun has all but disappeared. Indeed, this image is one of the examples typically used to test colour to greyscale algorithms[7]. In FIG. 5C the output of the least-squares reconstruction to the gradient field derived from the image colour tensors according to the method of Socolinsky and Wolff is shown. Here their method has worked well and the contrast between sun and background is preserved in the output. FIG. 5D shows the output of the surjective gradient field reconstruction method according to an embodiment of the present invention. Here again are grey-scales that preserve the contrast details of the original.

Figure 6:
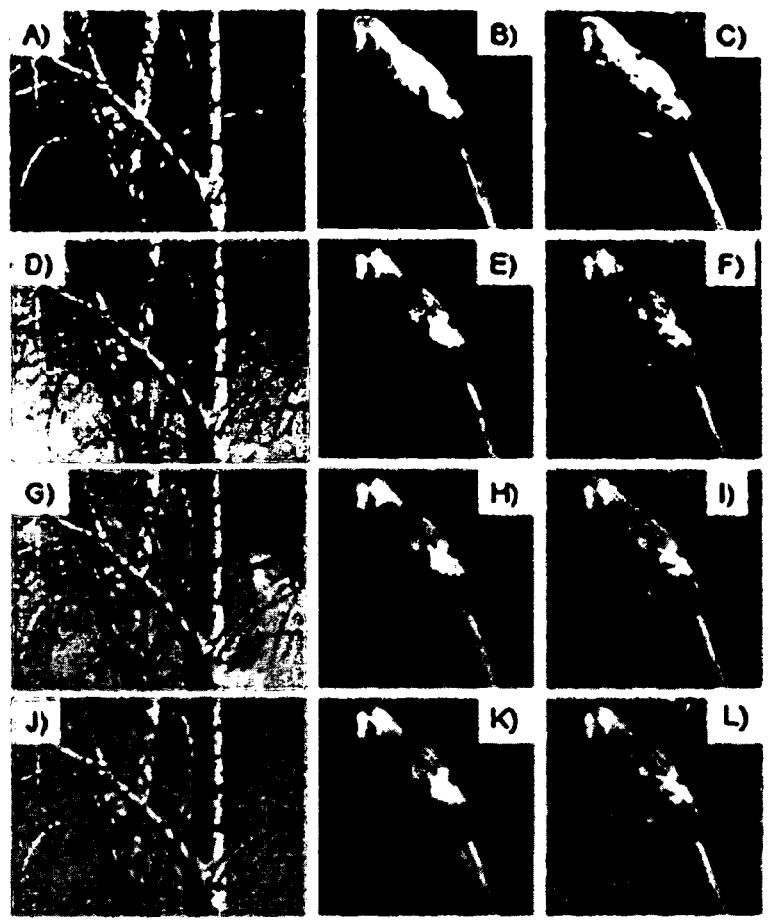
FIGS. 6A, 6B and 6C are original colour images.
FIGS. 6D, 6E and 6F are greyscales of FIGS. 6A, 6B and 6C respectively obtained by Socolinsky and Wolff.
FIGS. 6G, 6H and 6I are greyscales returned using Agrowal et al's reintegration of FIGS. 6D, 6E and 6F respectively.
FIGS. 6J, 6K and 6L show the reconstruction by surjective method.

In a second experiment, a further 3 images are considered as shown in the FIGS. 6A-C respectively. These are originally a picture of trees with a background of blue sky, a segmented parrot, and the original parrot (FIGS. 6A, 6B and 6C). All 3 images have been reduced to greyscale for this document but were processed as colour input images. All three images are known to cause problems for the least-squares reconstruction of the Socolinsky and Wolff method, the outputs of which are shown in FIGS. 6D, 6E and 6F respectively. Applying the Agrawal et al. method to reintegrate the gradient field delivered by Socolinsky and Wolff's method and this results in outputs as shown in FIGS. 6G, 6H and 6I.

Note there is a definite improvement for the segmented parrot image of FIG. 6B (the result of processing being shown in FIG. 6H), but the method still fails for FIGS. 6A and 6C (as shown in the results in FIGS. 6G and 6I respectively) which show highly visible reconstruction artefacts. The results produced by processing using the Surjective method according to an embodiment of the present invention are shown in FIGS. 6J, 6K and 6L. As will be seen, the reconstruction by the surjective method remains good.

Figure 7:
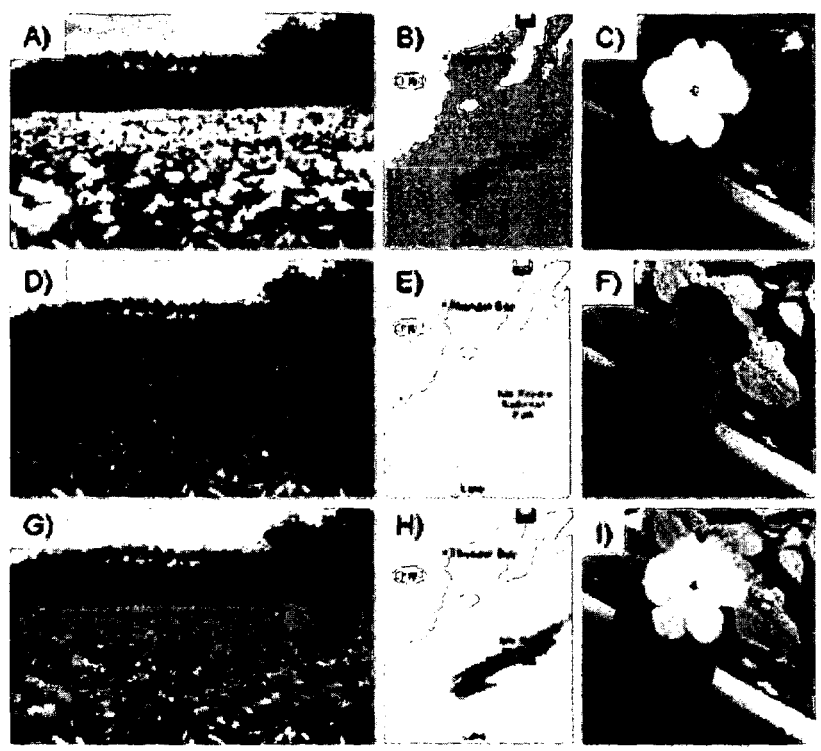
FIGS. 7A, 7B and 7C show known problem images for traditional luminance greyscale enclosings.
FIGS. 7D, 7E and 7F show the traditional luminance greyscale enclosings.
FIGS. 7G, 7H and 7I show good reconstruction of the 3 images by our surjective colour to greyscale transform.

In FIG. 7, a further 3 images are considered that are known to cause problems for traditional Luminance encodings of colour images. FIGS. 7A, 7B and 7C show what are greyscale conversions of the colour originals (respectively, a field of red poppies against the backdrop of a forest and a cloudy blue sky; a map showing mainland in the top left corner in yellow, the sea in blue and an island in green in the bottom right; and an image of a red flower against green foliage and a background of brown leaves on the ground) and FIGS. 7D, 7E and 7F the Luminance encodings. In all 3 cases important details have been lost in luminance encoding. FIGS. 7G, 7H and 7I show the results produced by processing using the surjective method according to an embodiment of the present invention. Again, natural greyscale images are produced, without artefact, and which maintain the details present in the colour original. Further, experimental evidence to date reflects that the surjective gradient field reconstruction method produces a natural looking grey-scale image for colour counterparts which also maintains the visible colour contrasts.

Figure 8:
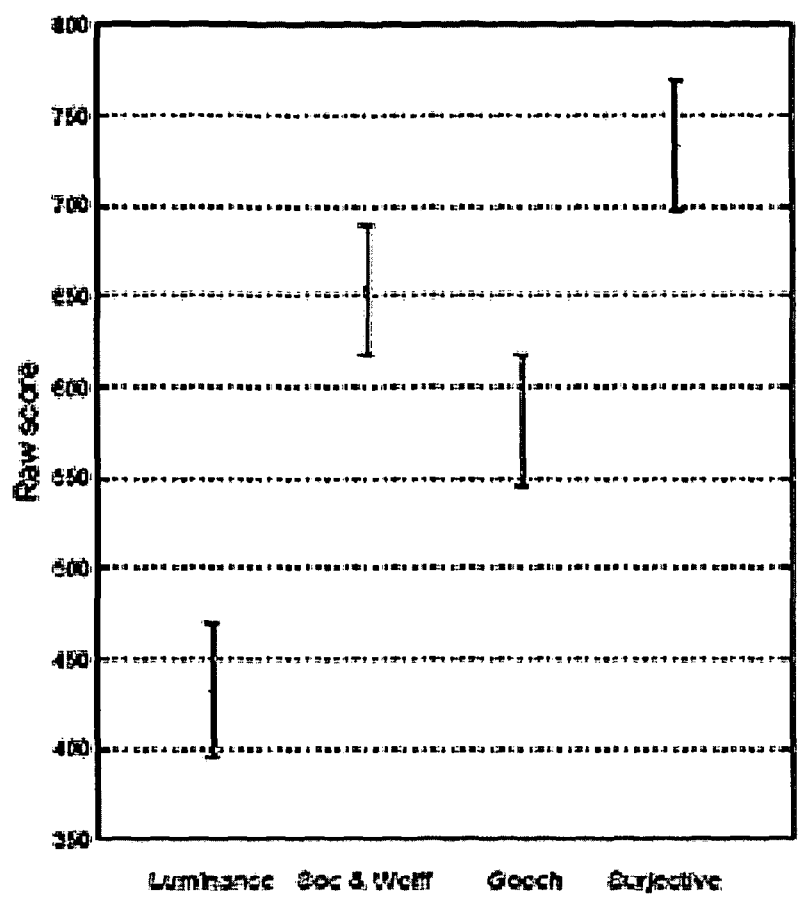
FIG. 8 shows the results of a psychophysical evaluation of 4 methods for colour-to-grey.

In a final experiment, to evaluate the performance of the surjective method according to an embodiment of the present invention, results are compared to other existing algorithms in a psychophysical evaluation. A 2-alternative-forced-choice (2AFC) paradigm is used, where pairs of colour-to grey renderings are shown side by side and observers are asked to choose their preferred reproduction. Results from the surjective method according to an embodiment of the present invention are compared with results from three other algorithms: the luminance transform, which is the standard method and displays an estimate of the brightness at each pixel; the Gooch et al. transform [14], which also aims to maintain contrast in the output image and is considered the state-of-the-art method (this algorithm contains three parameters, which we set at values of $\alpha=10\mu=\text{FULL}$ (each pixel is compared with all others) and $\theta=45°$ for all images); and the original algorithm of Socolinsky and Wolff, where the gradient field is reintegrated using a least squares solution to Poisson's equation [11]. The Socolinsky and Wolff method can generate a greyscale image whose values exceed the range [0 1]; in this case the linear gamut mapping algorithm described in [4] is used. To compare the methods, 10 colour images were used, composed of 6 natural scenes and 4 graphics images. A group of 10 naive observers were used, where each observer repeated a given judgement 4 times. In FIG. 8, the raw scores are plotted for each of the methods, where the raw score represents the total number of times that a method is preferred, summed over all observers, repetitions and images. It is important to note that the error bars in this figure do not explicitly represent uncertainty in the scores, but rather overlapping error bars indicate scores that are not significantly different at the 5% level. To compute the significance levels, the method outlined by David [5] is used. In this method one computes a critical score difference at a given confidence level, and when a difference between two scores exceeds this critical level the difference is deemed to be significant. Here the significant difference was found to be 73, thus the error bars have an extent of 73 units. The results of the experiment show that the surjective method significantly outperforms the other three algorithms. It was also found that this result is more marked for graphics images than for natural scenes, where the three contrast-preserving methods have the same order, but the differences between them are not significant.

4.1 Shading Recovery

The surjective recovery of the shading-intensity field of 3A is shown in FIG. 3D. Clearly, the effect of the coloured lettering is removed and means that the resultant image is ready for use in carrying out shape from shading.

In order to examine the surjective method more quantitatively and to compare the shading-field result with some ground-truth field, instead of to the least-squares Poisson solution, a synthetic example is constructed and discussed below.

Figure 9:
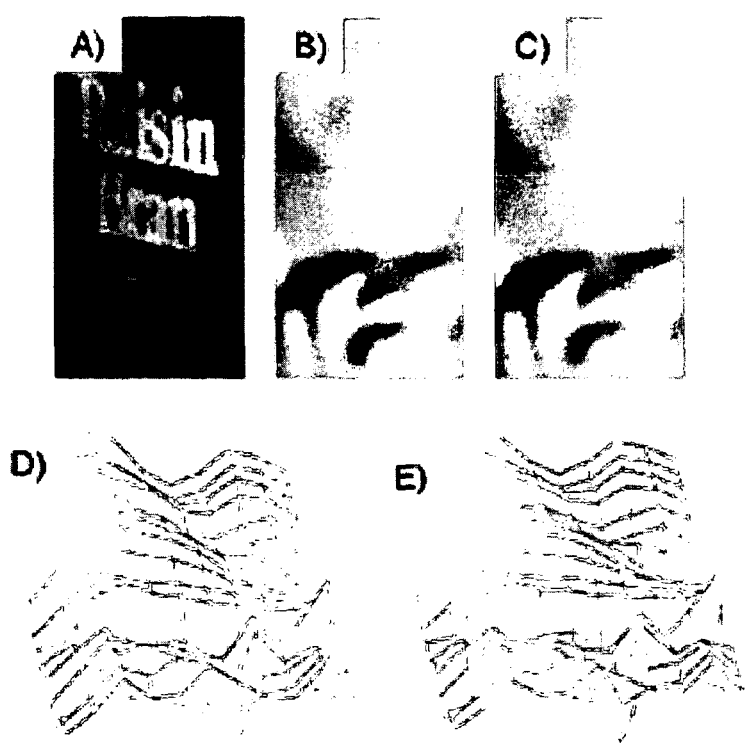
FIG. 9A shows the chromaticity image of the Raisin Bran Cereal box modulated by the Motzart shading field.
FIGS. 9B and 9C show respectively the actual ground-truth shading and the shading recovered by our surjective method.
FIGS. 9D and 9E show the shading fields as a mesh plot.

Applying the colour in FIG. 3A to a same-sized shading field derived from a depth map (Mozart bust) results in an image shown in FIG. 9A. A ground-truth shading field, FIG. 9B, can be compared to (shading is derived from an illuminant from angles {slant, tilt}={56°, 76°}, applied to the depth map).

The actual shading field is shown in FIG. 9B with the shading field recovered from the Surjective method according to an embodiment of the present invention being shown in FIG. 9C. The results from the original method of section 2.2 method is very similar, with correlation coefficient 0.9901. In comparison to the correct, synthetic shading, the Surjective method does slightly better: the original method produces shading with a correlation coefficient of 0.9827 compared to the ground truth, whereas the Surjective method's value is 0.9966. Mesh plots of the actual and surjectively recovered shading fields are shown in FIGS. 9D and 9E.

Section 5

As discussed above, there are many problems in computer vision that are solved in the Gradient domain. An image is differentiated, the gradients are manipulated, and an output image is found by reintegration. Problems tackled include, shape from shading[16], photometric stereo[25], dynamic range compression[8], shadow removal[12], lightness estimation[3] and the calculation of intrinsic images[24]. However, the idea, though simple and elegant, is sometimes difficult to implement in practice because the manipulated gradient field is non-integrable: there is no image that when differentiated results in the gradient field at hand. Least-squares reintegration can result in large smearing artefacts [12]. While methods exist for correcting gradient fields[1] they often work best when the field is almost integrable.

As recited in connection with embodiments of the present invention, for multichannel images the underlying gradient field is sometimes a surjective map to the target gradient field. In particular we examine the problem of recovering the shading field for a colour image and that of coding multichannel image contrast in a greyscale image. Both these problems are amenable to surjective gradient field reconstruction. Experiments demonstrate that colour images can be transformed to grey-scale without introducing artefacts whilst also recover the shading field from colour images. Moreover, results produced by embodiments according to the present invention compare favourably with antecedent gradient field reconstructions in user studies. Further, embodiments according to the present invention can be implemented simply and in a manner that is fast (in comparison to other methods) to produce results.

REFERENCES

The various references identified in this application are set out below and are each herein incorporated by reference:

[1] A. Agrawal, R. Chellappa, and R. Raskar. An algebraic approach to surface reconstruction from gradient fields. In ICCV05, pages I: 174-181, 2005. 3, 8
[2] R. Bala and R. Eschbach. Spatial color-to-grayscale transform preserving chrominance edge information. In 12th Color Imaging Conference: Color, Science, Systems and Applications., pages 82-86, 2004. 3
[3] A. Blake. Boundary conditions for lightness computation in Mondrian world. Comp. Vision, Graphics, and Image Proc., 32:314-327, 1985. 1, 8
[4] D. Connah, G. D. Finlayson, and M. Bloj. Coding contrast as brightness to convert colour images to greyscale. Perception, 36:303-303, 2007. 6
[5] H. David. The Method of Paired Comparisons. Charles Griffin and Company, London, 1969. 7
[6] S. Di Zenzo. A note on the gradient of a multi-image. Comp. Vision, Graphics, and Image Proc., 33:116-125, 1986. 3
[7] M. Drew, D. Connah, G. Finlayson, and M. Bloj. Improved colour to greyscale via integrability correction. In B. Rogowitz and T. Pappas, editors, Human Vision and Electronic Imaging XIV, 2009. 6
[8] R. Fattal, D. Lischinski, and M. Werman. Gradient domain high dynamic range compression. ACM Trans. on Graphics, 21:249-256, 2002. 8
[9] G. Finlayson, S. Hordley, C. Lu, and M. Drew. On the removal of shadows from images. IEEE Trans. Patt. Anal. Mach. Intell., 28:59-68, 2006. 1
[10] J. Frankle and J. McCann. Method and apparatus for lightness imaging. In U.S. Pat. No. 4,384,336. May 1983. 5
[11] R. T. Frankot and R. Chellappa. A method for enforcing integrability in shape from shading algorithms. PAMI, 10:439-451, 1988. 6
[12] C. Fredembach and G. Finlayson. Hamiltonian path based shadow removal. In 16th British Machine Vision Conf, BMVC2005, pages 970-980, 2005. 3, 8
[13] B. V. Funt, M. S. Drew, and M. Brockington. Recovering shading from color images. In G. Sandini, editor, ECCV-92: Second European Conference on Computer Vision, pages 124-132, 1992. 1, 4
[14] A. Gooch, S. Olsen, J. Tumblin, and B. Gooch. Color2gray: salience-preserving color removal. ACM Trans. Graph., 24(3):634-639, 2005. 3, 6
[15] B. K. P. Horn. Robot Vision. MIT Press, 1986. 1
[16] B. K. P. Horn and M. J. Brooks. The variational approach to shape from shading. Comp. Vision, Graphics, and Image Proc., 33:174-208, 1986. 7
[17] B. Karacali and W. Snyder. Noise reduction in surface reconstruction from a given gradient field. Int. J. Comp. Vision, 60:25-44, 2004. 1
[18] P. P'erez, M. Gangnet, and A. Blake. Poisson image editing. ACM Trans. Graph., 22(3):313-318, 2005. 1
[19] R. Raskar, A. Hie, and J. Yu. Image fusion for context enhancement and video surrealism. In NPAR '04: 3rd Int. Symp. on Non-photorealistic Animation and Rendering, pages 85-152, 2004. 1
[20] J. M. Rubin and W. A. Richards. Color vision and image intensities: When are changes material. Biological Cybernetics, 45:215-226, 1982. 4
[21] D. Socolinsky and L. Wolff. A new visualization paradigm for multispectral imagery and data fusion. In CVPR, pages 1:319-324, 1999. 3, 4
[22] D. Socolinsky and L. Wolff. Multispectral image visualization through first-order fusion. IEEE Trans. Im. Proc., 11:923-931, 2002. 1, 3
[23] D. A. Socolinsky. A Variational Approach to Image Fusion. PhD thesis, The Johns Hopkins University, April 2000. 4
[24] M. Tappen, W. Freeman, and E. Adelson. Recovering intrinsic images from a single image. In Advances in Neural Information Processing Systems 15. MIT Press, 2003. 8
[25] R. J. Woodham. Photometric method for determining surface orientation from multiple images. Optical Engineering, 19:139-144, 1980. 1, 7

The invention claimed is:

1. A method of producing a scalar image from a derivative field and a vector image, the derivative field being calculated or derived from the vector image, the method including the steps of:
   a) retrieving, by a processing unit of at least one computing device, a function class c from a data store, wherein all members of the class c are a finite number of prepopulated functions which map each vector of the vector image to a unique scalar value;
   b) selecting, by the processing unit of the at least one computing device, a function f from the class c which maps the vector image to a scalar image, a derivative field of the function f being closest to the derivative field from amongst derivative fields of other members of the function class c; and
   c) generating, by the processing unit of the at least one computing device, the scalar image from the vector image by using the function f to calculate each scalar value in the scalar image from a corresponding vector in the vector image, wherein the calculation of each scalar value is performed without solving Poisson's equation.

2. The method of claim 1, wherein all members of the class c are surjective functions.

3. The method of claim 1, wherein all members of the class c are smoothly varying functions.

4. The method of claim 1, wherein all members of the class c are polynomial functions.

5. The method of claim 4, wherein all members of the class c are second order polynomial functions.

6. The method of claim 1, wherein all members of the class c are look up table operations.

7. The method of claim 6, wherein all members of the class c are look up table operations with local interpolation.

8. The method of claim 1, wherein the derivative field is derived from the vector image.

9. The method of claim 1, wherein the derivative field is based on 1st order derivative calculations.

10. The method of claim 1, wherein the derivative field is based on 2nd order derivative calculations.

11. The method of claim 1, wherein the derivative field is defined as a vector of components wherein each component is a linear combination of at least one order of derivative-type calculations.

12. The method of claim 1, wherein the vector image is a multi-spectral image.

13. The method of claim 1, wherein the vector image is a hyper-spectral image.

14. The method of claim 1, wherein the vector image is a chromaticity image.

15. A method of producing a second vector image from a derivative field and a first vector image, including the steps of:
   defining, by a processing unit of the at least one computing device, the second vector image to be composed of a separate scalar image in each spectral dimension;
   producing, by the processing unit of the at least one computing device, the respective scalar image for each spectral dimension from the derivative field and the first vector image, wherein for each spectral dimension, the step of producing including the steps of:
      a) retrieving, by the processing unit of the at least one computing device, a function class c from a data store, wherein all members of the class c are pre-populated functions which map each vector of the vector image to a unique scalar value;
      b) selecting, by the processing unit of the at least one computing device, a function f from the class c which maps the first vector image to a scalar image, a derivative of the function f being closest to the derivative field from amongst derivative fields of other members of the function class c; and
      c) generating, by the processing unit of the at least one computing device, the scalar image for the spectral dimension from the first vector image by using the function f to calculate each scalar value in the scalar image from a corresponding vector in the first vector image, wherein the calculation of each scalar value is performed without solving Poisson's equation.

16. A method of producing a master scalar image from a master derivative field and a master vector image including the steps of:
   i) dividing, by a processing unit of at least one computing device, each of the master scalar image, the master derivative field and the master vector image into a plurality of corresponding regions, each region comprising a master scalar image region, a master derivative field region and a master vector image region; and
   ii) for each region:
      a) retrieving, by the processing unit of the at least one computing device, a function class c from a data store, wherein all members of the class c are pre-populated functions which map each vector of the vector image to a unique scalar value;
      b) selecting, by the processing unit of the at least one computing device, a function f from the class c which maps the master vector image to a scalar image, a derivative of the function f being closest to the derivative field from amongst derivative fields of other members of the function class c; and
      c) generating, by the processing unit of the at least one computing device, the scalar image for the spectral dimension from the master vector image by using the function f to calculate each scalar value in the scalar image from a corresponding vector in the master vector image, wherein the calculation of each scalar value is performed without solving Poisson's equation.

17. The method of claim 16, wherein in step (c) of the method applied to each region, the step of using f to calculate each scalar value in the scalar image comprises applying, by the at least one computing device, a function g to calculate each scalar value in the scalar image from a corresponding vector in the master vector image region, wherein selecting the function f further comprises calculating g as a weighted combination of functions f for other proximal regions.

18. The method of claim 16, further comprising producing a second master vector image from the master derivative field and master vector image, including the steps of:
   defining, by the at least one computing device, the second master vector image to be composed of a separate master scalar image in each spectral dimension; and
   performing the dividing, the selecting the function class c, the selecting the function f, and the generating the scalar region for each spectral dimension.

19. A computer implemented image reconstruction system comprising:
   a first data receiving module configured to receive data on a vector image;
   a second data receiving module configured to obtain data on a derivative field; and
   a processing unit configured to execute computer program code to:
      retrieve a function class c from a data store, wherein all members of the function class c are functions which map each vector of the vector image to a unique scalar value, wherein the function class c comprises a finite number of prepopulated functions;
      select a function f from the class c which maps the vector image to a scalar image, a derivative of the function f being closest to the derivative field from amongst derivative fields of other members of the function class c; and
      generate the scalar image from the vector image by using the function f to calculate each scalar value in the scalar image from a corresponding vector in the vector image, wherein the calculation of each scalar value is performed without solving Poisson's equation; and, output the scalar image.

* * * * *